Oct. 21, 1969     E. J. KELLY     3,473,788

BATCH-COMPOUNDING OF COMMINUTED MATERIALS

Filed March 22, 1968     2 Sheets-Sheet 1

FIG. 1.

INVENTOR.
EDGAR J. KELLY
BY
Miketta, Glenny, Poms & Smith
ATTORNEYS.

Oct. 21, 1969     E. J. KELLY     3,473,788
BATCH-COMPOUNDING OF COMMINUTED MATERIALS
Filed March 22, 1968     2 Sheets-Sheet 2
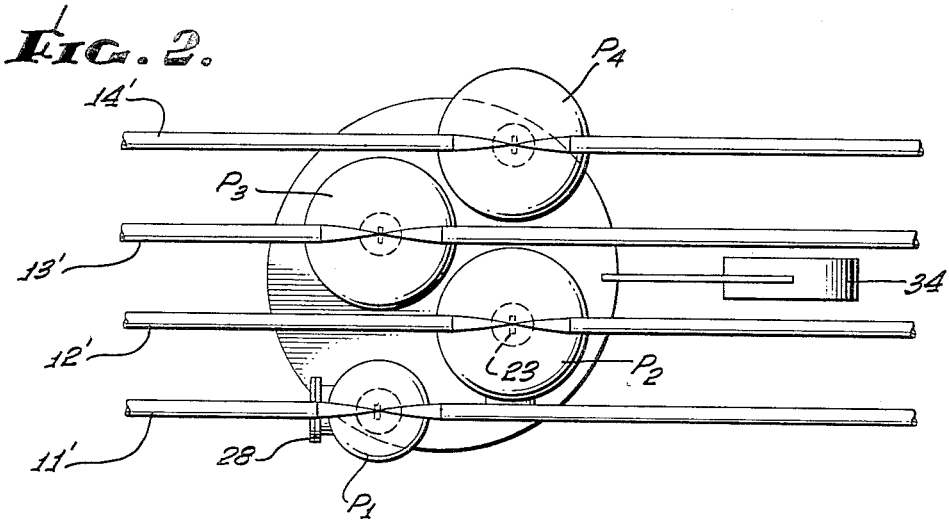
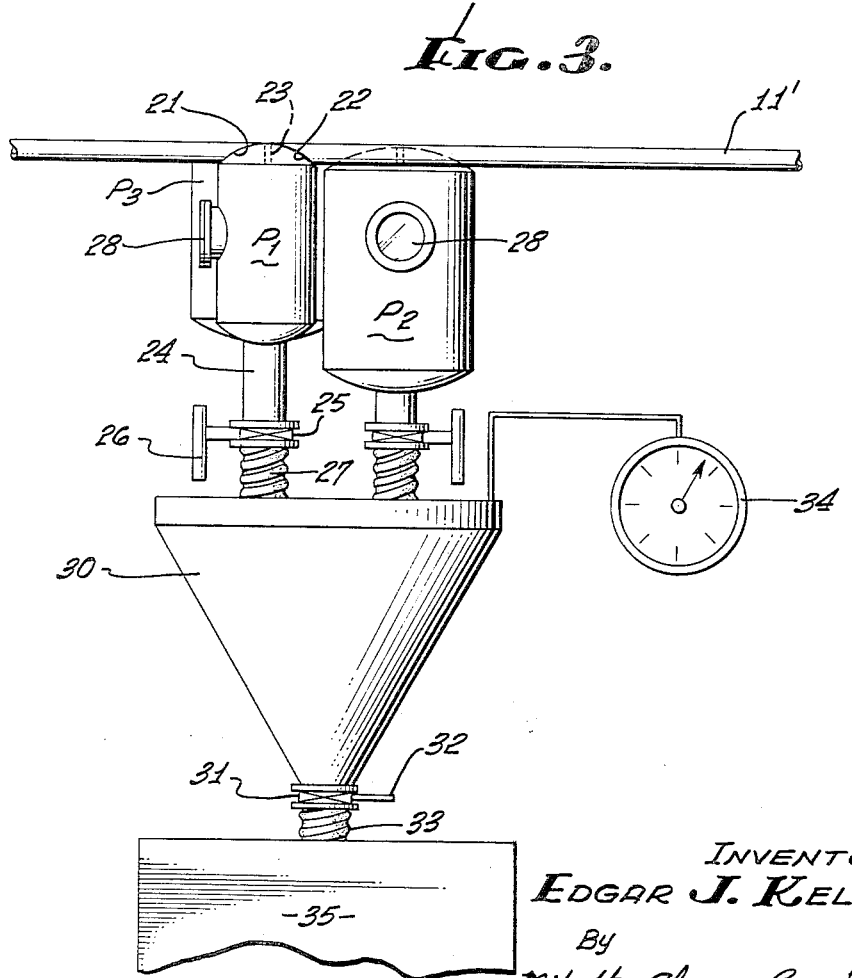
INVENTOR.
EDGAR J. KELLY
By
Miketta, Glenny, Poms & Smith
ATTORNEYS.

United States Patent Office 3,473,788
Patented Oct. 21, 1969

3,473,788
BATCH-COMPOUNDING OF COMMINUTED
MATERIALS
Edgar J. Kelly, Lake Zurich, Ill., assignor to American
Colloid Company, Skokie, Ill., a corporation of
Delaware
Filed Mar. 22, 1968, Ser. No. 715,262
Int. Cl. B28c 7/04; B65g 53/04
U.S. Cl. 259—149                                    16 Claims

ABSTRACT OF THE DISCLOSURE

A method of rapidly batch-compounding finely divided or comminuted materials at a plurality of compounding zones. Each compounding zone includes a series of material pods, each holding the approximate amount of material used per batch; a pneumatic system is established carrying a constant stream of material from a large silo to each of the compounding stations and returning the excess back to the silo. The material pods at each compounding station are thus constantly being replenished and compounding may be carried out rapidly and economically without the necessity of pneumatically moving a very large quantity or weight of any material in an amount equivalent to a high delivery rate. A system for carrying out the method is claimed as well as the method.

---

The movement of finely divided or comminuted solid materials such as clays, sand, pulverized coal, coke, wood flour and the like from one point to a delivery point by means of air or gas, the finely divided materials being carried in the form of a suspension in a stream of such gas, has been utilized in the past. However, such prior systems have always contemplated moving these finely divided materials from a transport vehicle such as a boxcar to a final destination. The present invention however, contemplates a system whereby a plurality of compounding or mixing zones are constantly supplied by a airborne stream of materials which constantly circulates from a storage or silo, past a number of compounding zones and back again to the silo, thereby permitting the compounding zones to be replenished with material in accordance with the rate of use of the material by each of such compounding zones.

Many factories, foundries, producers of sintered metal objects, etc. require numerous batches of pre-blended, finely divided or crushed solid materials for their manufacturing operations. A foundry, for example, may have a series of casting lines in operation, each requiring molding or coarse sand mixes, some of different composition by reason of variations in type of metal or alloy being cast. A large number of batches of such molding and core mixes may have to be made every day. For example, a total of ten tons of but a single ingredient (bentonite in this example) may be used by the foundry per hour, for admixture with three other ingredients in varying proportions, and the delivery time to the mixing equipment should not exceed 2 or 3 minutes for the ten tons. A normal pneumatic delivery system capable of picking up material from one point and delivering it to another point should have a capacity therefore of about 300 tons per hour. But such a system would be very expensive, large and inefficient since a blending or mixing station operates only about 2 to 5 minutes out of the hour.

According to the method of this invention an adequate supply of material is maintained in large storage silos at one location and a constant stream of such material is kept in a closed circuit circulation from the silo to a plurality of compounding or mixing stations located elsewhere in the plant adjacent to the lines of use. At each of these stations, a smaller quantity of the material is always available for use and is automatically replenished as it is used. If, two compounding stations each require 2 tons per batch per hour, the present system will adequately supply both stations by providing a small supply pod carrying, say, 2 tons at each station and supplying a constant feed of material to these pods at the rate of not over 2 tons per hour. The saving in equipment and horsepower and the advantages of flexibility and operation are enormous.

Generally started, the method of the present invention contemplates establishing an individual storage zone for each finely divided or comminuted material to be used in batch-compounding. At a remote point or points, a plurality of compounding zones is established, each of such compounding zones including a plurality of material receiving pods, one allocated to each material to be employed in compounding. Preferably these pods are clustered above a weighing hopper adapted to receive material from the pods. A continuous airborne stream of each material is then established running from the lower portion of each individual storage zone to a correlated material pod and then back to the upper portion of such storage zone, whereby each material pod is constantly in communication with an airborne stream of material. The compounding zone can then be actuated so as to discharge material from each of the pods into its related weighing hopper in quantities desired, the material from the hopper then being discharged into a blender to mix the contents. The blender then can pneumatically discharge the blend material to any desired use zone.

The present invention also relates to the construction of compounding stations, the provision of means whereby each material supplied to the pods is at least partially de-aerated and other elements of construction which render the entire system and units simple, effective and inexpensive.

An object of the present invention therefore is to disclose and provide a novel and efficient method of continually supplying a plurality of use zones with finely divided materials without the necessity of overloading the conveying system.

A further object of the invention is to disclose and provide means and methods of rapidly batch-compounding comminuted materials in accordance with any predetermined formulation.

A further object is to disclose and provide a compounding station for compounding a plurality of comminuted materials in an efficient manner, each of the compounding stations being supplied with a constantly flowing airborne stream of individual materials being used at the station, and including means whereby each of such airborne materials is at least partially de-aerated before it goes into a weighing hopper of the compounding station.

These and various other objects, advantages and uses of the present invention will become apparent to those skilled in the art from the following description of certain exemplary forms. For purposes of example and illustration, reference will be had to the appended drawings in which:

FIG. 1 is a simplified diagrammatic representation illustrating one application of the method of this invention;

FIG. 2 is a plan view of a representative compounding station, illustrating one form and arrangement of material pods;

FIG. 3 is a side view of the arrangement shown in FIG. 2.

In many industrial plants, finely divided or comminuted or granular materials are often discharged from transport cars and conveyed to silos by pneumatic systems, i.e. by having the finely divided material suspended in a stream of flowing air or gas, the material being deposited in a silo while the gas escapes through a dust collector or is returned to the compressor blower furnishing the conveying gas. Such systems have been heretofore disclosed in U.S. Patents 2,030,553 and 2,190,727; improvements thereon are disclosed in my copending application Ser. No. 561,527, now Patent No 3,393,943. For purposes of example, the drawings will refer to a system in which four different materials in finely divided or comminuted form are used in making a mix or blend such as those employed in foundries for molding, cores, etc. Among materials so employed may be mentioned pulverized coal, wood flour, bentonite and clay. It is to be understood however that the invention is not limited to the use of these particular materials nor to its adaptation to any particular industry, since the methods of the present invention may be employed in compounding various finely divided materials such as talc, clay, silica, sand and other minerals in the ceramic industry, various powdered metals and ores in the metallurgical industry, solid organics and inorganics in the chemical industry, etc.

In the diagrammatic representation, FIG. 1, four different finely divided materials are supplied by conduits 1, 2, 3 and 4 (said conduits carrying an air suspension of the material in each case) to large storage silos generally represented by $S_1$, $S_2$, $S_3$, and $S_4$, respectively. It is to be understood that these silos are replenished when necessary or when a shipment of the desired material is brought to the plant. Each one of the silos $S_1$-$S_4$ is provided with a valved bottom discharge outlet conduit indicated at 11, 12, 13 and 14, respectively. Each one of the silos is also provided with a vent which may or may not be associated with a dust collector, these vents being indicated at 10 and 10′. During operation, each of the bottom discharge conduits 11–14 discharges material from its associated silo into a recirculation and supply line, silo 1 discharging through its valved conduit 11 into recirculation line 11′, silo 2 discharging through valve discharge conduit 12 into recirculation line 12′, silo 4 discharging through its outlet pipe into recirculation line 14′, etc. Each recirculation line is provided with its own blower or source of air sufficient in volume to convey the material in the form of an airborne suspension into operative association with one or more compounding stations and returning the unused material back into the silo from which the material originated. The blowers are indicated at 11″, 12″, etc. It will be noticed that all of these circulating lines such as 11′ return the unused material to the top of the silo from which the material originated.

In order to prevent breaking and insure the free flow of comminuted material from each silo into its bottom discharge conduit, each silo may be provided with an aerating pad or pads such as 18 and 18′ positioned along the floor or inclined bottom sides of the silo. These pads such as 18 are supplied through a valved branch line 17 with compressed air from a manifold line 16 supplied with air from a suitable compressor or blower 15.

It is to be understood that the silos $S_1$-$S_4$ may differ in volume depending upon the relative quantities of the materials employed during mixing. In the usual case these silos may vary from 2,000 to 10,000 cubic foot capacity each and thereby contain from 50 to 100 tons of material each.

It will be evident that the system so far described has established a separate enclosed, continuously flowing airborne current of each comminuted material desired for use in a mix to be compounded. These constantly flowing streams of finely divided material now pass one or more compounding zones consecutively. A single compounding zone is generally indicated at 20; the break in the conduits 11′–14′ is used to indicate the presence of other similarly arranged and connected compounding zones associated with such lines before such lines return to the upper portions of the silos in which the material originated.

The exemplified compounding station 20 comprises a plurality of hollow, vertically elongated material receivers or pods identified as $P_1$, $P_2$, $P_3$ and $P_4$, preferably arranged as a cluster between the supply lines 11′–14′ and the top of the hopper 30 of a weighing machine. The upper portion of each pod taps its associated supply line; for example pod $P_1$ taps supply line 11′ while pod $P_2$ taps supply line 12′, etc. As diagrammatically illustrated in FIG. 1 the upper end of each pod is adapted to receive a specific material from its associated supply line; the bottom of each receptacle or pod is provided with an outlet or discharge provided with a valve leading to the weighing hopper 30. FIGS. 2 and 3 show in greater detail a cluster of such pods and a preferred method of associating them with the supply lines and hopper. As they are shown a section of all of the supply lines of 11′–14′ preferably extends in a substantially horizontal plane in the region of a compounding zone or unit so as to permit the various pods $P_1$–$P_4$ to be clustered for discharge of their contents into a single weighing hopper 30. As illustrated in these figures each of the pods is provided with a domed head provided with an inlet 21 and an outlet port 22 the inlets and outlets being aligned, of ovoidal shape and a cross section greater than the cross section of the conduit 11′ connected thereto. The incoming suspension of material is therefore preferably passed through the upper end portion of a pod in a substantially diametrical direction. The supply conduit 11′ may have an opening cut thereinto so as to fit the inlets and outlets 21 and 22 of a pod and be welded thereto. The bottom of each pod is provided with a discharge conduit such as 24 provided with a valve 25, the valve being manually or automatically actuatable by a suitable actuating device 26. This valve discharge outlet is now connected by means of a flexible conduit 27 with the weigh hopper 30. Each pod may be provided with a sight glass and clean out opening 28 in a side wall. All of the description here given relates particularly to pod $P_1$ and its associated supply conduit; each of the other pods is similarly associated and connected to its correlated supply line, that is, pod $P_2$ is similarly associated with supply line 12′, pod $P_3$ is associated with supply line 13′, etc.

The various pods or material receivers $P_1$–$P_4$ preferably have volumetric contents which vary virtually inversely with the bulk density of the predetermined material which is to be received by each pod. The volume of each pod may be somewhat less than that required for compounding a single batch from the various materials being supplied. It is to be understood that a constant stream or flow of airborne material is passing into a pod at all times from supply line 11′, any finely divided material which is not retained within the pod being discharged with the conveying gas through the outlet 22 and continuing to the next compounding unit in series. It has been found extremely desirable to at least partially de-aerate the solid materials deposited in the pod and for this purpose a substantially vertical impact baffle 23 is positioned within the pod between the inlet and outlet at the upper end of the pod, so as to deflect solids being brought into the pod downwardly toward the bottom, the conveying gas or air bypassing the baffle and continuing on its way to the next unit.

Each weighing hopper 30 is provided with a valved outlet 31 provided with an actuating means 32, such outlet being then connected as by means of a flexible conduit 33 with a blending or mixing device 35. Each weighing hopper is also provided with an indicating scale 34 whereby the weight of each material discharged into the hopper can be observed and the total weight of the mixture determined.

Each blender 35 may be provided with a suitable motor drive 36 and with a discharge outlet 37 leading to a conduit or line 38 which will convey the material to any one of a number of use stations. Preferably the mixture is conveyed pneumatically and 39 indicates a blower for carrying the discharged material along the line 38 to its point of use. Each of the use stations may include a bin or hopper 40, 40′ and the like, the top of each bin 40 being connected as by a Y connection 41 to the conveying duct 38 by means of a flap valve 42 adapted to divert the material being supplied by duct 38 into the bin 40. Each bin 40 may be provided with a valved outlet 43 and a device for indicating the level of material within the bin, such device being indicated at 44. Such devices are well known in the art and ordinarily are capacitance-actuated level measurement instruments. Each of these stations is also provided with a dust collector or vent 45 connected to the top of each of the bins 40. The extreme end of the conveying duct 38 which feeds a series of use stations 40, 40' and the like, is generally connected to a larger vent and dust collector or blanked off adjacent the discharge to the last of these stations.

It is to be understood that the operations carried out at the various compounding zones may be conducted either manually or automatically; the valves 25 and actuating means 26 at each of the pod outlets can be operated manually, with the operator watching the scale 34 or a complete batch may be taped or card coded and programmed and when a particular batch is desired and a card inserted, the valves can be automatically opened and closed in sequence to the various pods, each valve automatically closing when the desired weight of material was added to the weighing hopper, the scale on the weighing hopper being arranged to close the circuit whenever a given weight has been added to the hopper. Upon completion of the sequence, the valve from the hopper to the blender is automatically opened and the blender actuated to mix and discharge and convey the batch to the desired point of use, either the operator or the coded card then controlling the operation of the flap valve 42 at the desired point of use. Automation of equipment, valves, etc, together with the introduction of circuitry which would permit a weighing scale to control operations once they are started in accordance with the given code, is well within the skill of electrical technicians and its details are not claimed herein.

From the description given hereinabove, it will be evident that means have been provided whereby a method of rapidly batch-compounding finely divided materials for use at one or more remote use zones has been provided, such method including the steps of establishing an individual storage zone for each material to be used in batch compounding, such as zones $S_1$–$S_4$, then establishing one or more compounding zones such as 20, each zone including a plurality of material receiving pods, one for each material to be employed in compounding and a weighing hopper, such as 30, adapted to receive the material from the pods. The method includes the establishment of a continuous airborne stream of material from a lower portion of each individual storage zone, such as $S_4$, to a correlated material pod (such as $P_4$) and back to the upper portion of such storage zone. A constant fluid borne stream of materials is thus in communication with each of the pods. Each of the pods is constantly being replenished. When it is desired to compound the batch, the various pods are caused to discharge their contents into a weighing hopper either under the control of the operator or by means of automatic controls, their contents are then discharged into a weighing hopper which insures that the proper proportionate weight of each material being mixed is added to the hopper, and the batch thus compounded is then automatically discharged into a blender and then into a stream of conveying gas which sends it to any one or more of use stations. It will be evident that batches differing in proportions may be readily made at the same use station, and a special or different batch may be conveyed to a specific use station by making certain that the various flap valves 42 leading to the bins 40 which are not supposed to receive that batch, are closed and only the valve 42 which is in communication with the desired use station bin is open. The system is extremely economical and flexible.

As previously indicated, pneumatic airborne streams of material includes the use of air or reducing or inert gases; for example when powdered coal or coke is employed, it may be desirable to use carbon dioxide. The number of compounding stations may be greatly varied; the number of use stations, remote from the compounding stations, may also be varied. In some instances because of the differences in character of batches to be compounded for a particular station, it may be desirable to have only one compounding station servicing that specialized use station whereas another compounding station may supply a plurality of use stations with batches which only differ to a minor degree from each other.

I claim:
1. A method of rapidly batch-compounding finely divided materials at a compounding zone for use at one or more remote use zones, comprising:
   establishing an individual storage zone for each material to be used in batch-compounding;
   establishing a compounding zone, said zone including a plurality of material receiving pods, one for each material to be employed in compounding, and a weighing hopper adapted to receive material from said plurality of pods;
   establishing a continuous airborne stream of material from a lower portion of each individual storage zone to a correlated material pod and back to the upper portion of such storage zone, whereby each material pod is constantly in communication with an airborne stream of material;
   actuating the compounding zone by discharging predetermined amounts of material from each of the pods into the weighing hopper;
   discharging the material contents of the weighing hopper into a blender to mix said contents and conveying the compounded and blended material to a remote use zone.

2. A method as stated in claim 1 including the step of virtually de-aerating the material received and retained by each pod.

3. A method as stated in claim 1 wherein a plurality of compounding zones are established, each compounding zone including a cluster of material receiving pods, a single continuous airborne stream of material from a lower portion of an individual storage zone being in communication with a correlated material pod of each compounding zone.

4. In a method of rapidly batch-compounding comminuted materials, the steps of:
   establishing a separate enclosed continuously flowing airborne current of each comminuted material desired for use in a mix to be compounded;
   establishing a plurality of material chambers in a cluster; one chamber for each comminuted material, each chamber having a volume correlated to the bulk density and quantity of material to be received therein;
   passing each flowing current directly through the upper portion of a separate chamber and deflecting material from such entering current downwardly into the chamber while continuously discharging air and excess material from said chamber to form a body of material in the lower portion of each chamber;
   and discharging controlled amounts of material from the lower portion of each chamber in succession into a common weighing zone to produce a compounded predetermined batch.

5. In a method as stated in claim 4 the step of partially de-aerating the material admitted to a chamber.

6. In a method as stated in claim 4 the steps of discharging the batch into a mixing zone and periodically pneumatically conveying said mixed batch from the mixing zone to a zone of use.

7. A compounding station for compounding comminuted materials, comprising:
   a plurality of hollow pods, each provided with an inlet and outlet in the upper end portion and a bottom outlet, vertically spaced from the upper inlet and outlet, each of said pods being adapted to receive a predetermined comminuted material through said upper inlet;

a single continuous pneumatic material supply conduit connected in series to the upper inlet and outlet ports of each of said pods;

a hopper provided with means for indicating the weight of its contents, said hopper being arranged to receive material from the bottom outlet of each of said pods, said hopper being provided with a selectively operable discharge opening;

and a blender operably associated with said hopper discharge opening to receive material therefrom.

8. A compounding station as stated in claim 7 wherein each of said pods includes an impingement baffle between said upper inlet and outlet ports, and the volumetric contents of each of said pods is correlated with the bulk density of the predetermined material received by such pod.

9. A compounding station as stated in claim 7 wherein each of said pods is provided with a substantially vertical impingement baffle between said upper inlet and outlet ports, whereby comminuted material received by said pod is partially de-aerated.

10. A compounding station as stated in claim 7 wherein the volumetric contents of said pods vary inversely with the bulk densities of the predetermined material received by each pod.

11. A compound station as stated in claim 7 wherein the blender is provided with a discharge port pneumatic conduit means for receiving blended materials from the blender discharge port and conveying the same to a zone of use.

12. A compounding station as stated in claim 7 including means associated with the bottom outlet of each of said pods, for selectively controlling the quantity of material delivered by each pod to said weighing hopper.

13. In a compounding station including a material receiving hopper of a weighing machine, the provision of:

a plurality of separate conduits, each conduit being adapted to carry a different comminuted material in an airborne constantly flowing stream, a portion of each of said conduits extending in virtually horizontal direction above a weighing hopper;

a plurality of hollow vertically elongated pods clustered above the weighing hopper, the upper end portion of each pod being in tapping communictaion with a predetermined separate conduit to provide a virtually diametrical flow of airborne material through such pod;

the lower portion of each pod being provided with a downward discharge including a selectively operable valve, and a flexible conduit connection between each such valved discharge and a weighing hopper common to said pods.

14. A compounding station as stated in claim 13 wherein the virtually diametrical flow of airborne material through a pod is interrupted by the provision of a vertical baffle adapted to downwardly deflect material entering the pod and partly de-aerate such material.

15. In a compounding station as stated in claim 13 wherein each pod has a domed upper end provided with aligned ovoidal ports of greater cross-sectional area than the transverse section of the associated conduit, and a vertical baffle between said ports adapted to downwardly deflect material entering the pod.

16. In a compounding station as stated in claim 13 wherein the volumetric capacity of each pod is correlated to the bulk volume of comminuted material carried by the conduit connected thereto.

References Cited

UNITED STATES PATENTS

| | | | |
|---|---|---|---|
| 2,030,553 | 2/1936 | Tiley | 214—83.2 |
| 2,190,727 | 2/1940 | McKenna | 214—83.28 |
| 2,572,862 | 10/1951 | Israel | 302—28 |
| 2,580,581 | 1/1952 | Niemitz | 302—28 |
| 3,110,421 | 11/1963 | Matthias | 259—154 |

ROBERT W. JENKINS, Primary Examiner

U.S. Cl. X.R.

529—165; 302—28